READ ONLY DATA PLANE

Filed June 7, 1968 6 Sheets-Sheet 1

INVENTOR.
WILLIAM A. REIMER
BY
Russell N. Muckleman
AGENT

READ ONLY DATA PLANE

Filed June 7, 1968 6 Sheets-Sheet 2

Oct. 20, 1970 W. A. REIMER 3,535,690

READ ONLY DATA PLANE

Filed June 7, 1968 6 Sheets-Sheet 3

Oct. 20, 1970 W. A. REIMER 3,535,690

READ ONLY DATA PLANE

Filed June 7, 1968 6 Sheets-Sheet 4

Oct. 20, 1970 W. A. REIMER 3,535,690

READ ONLY DATA PLANE

Filed June 7, 1968 6 Sheets-Sheet 5

Oct. 20, 1970 W. A. REIMER 3,535,690

READ ONLY DATA PLANE

Filed June 7, 1968 6 Sheets-Sheet 6

United States Patent Office 3,535,690

Patented Oct. 20, 1970

3,535,690
READ ONLY DATA PLANE

William A. Reimer, Wheaton, Ill., assignor to Automatic Electric Laboratories, Inc., Northlake, Ill., a corporation of Delaware Filed June 7, 1968, Ser. No. 735,319
Int. Cl. G11c *17/00*
U.S. Cl. 340—174 7 Claims

ABSTRACT OF THE DISCLOSURE

A read only data plane for use in memory systems makes use of a plurality of grids of vertical and horizontal conductors, which are formed side-by-side on that plane at each bit location to accommodate on that plane a plurality of windings linking the respective signal transfer elements at these bit locations in a coded pattern. The data planes may, for example, take the form of a woven mat of substantially the same length and width dimensions of its associated memory stack, they may also be in the form of a strip which may be folded back and forth, the folded sections being co-extensive to form the data plane. The coding is effected by interrupting and/or connecting selected conductors.

BACKGROUND OF THE INVENTION

Field of the invention

This invention relates to data planes, particularly to data planes for read only memories constructed as a woven fabric.

Description of the prior art

Data planes of the type with which the invention is more particularly concerned are described and illustrated by George G. Pick in U.S. Pat. No. 3,299,412 and by J. M. Donnelly et al. in their U.S. patent application entitled "Solenoid Array Memory Having Bipolar Output Signals," Ser. No. 379,941, filed July 2, 1964, and now abandoned as encoded, printed conductors carried on a substrate. In addition to the above application, read only memories having woven data planes are discussed by R. L. Alonso in an article entitled "Vintage Machine Produces Memories," Electronics, p. 88, May 1, 1967. The process for producing such planes is described therein as a program-controlled vertical separation of longitudinal conductors, which separations are manually transposed by 90° and temporarily held in place on a jig until the wires are encapsulated. Changes in coding require that additional wires be threaded through the plane, the wires carrying the unwanted code being disconnected and remaining in the encapsulated planes.

SUMMARY OF THE INVENTION

This invention in its primary aspect is directed to woven read only data planes for read only memory systems. The data planes of the present invention are thin, flexible sheets or strips of woven material including conductive and non-conductive strands as both the warp and woof of the fabric. The conductive strands are initially uninsulated wire, the entire data plane rather than the conductive members being insulated during production.

The data plane may be produced by weaving the fabric, encoding the data, forming apertures for accepting signal transfer apparatus, coating the fabric with insulation and cutting the fabric to the desired length; however, as can be determined from the detailed description, alternate steps and orders of performance may be employed as may be required for different applications of the data planes (e.g. encoding in the field).

BRIEF DESCRIPTION OF THE DRAWINGS

The invention, its organization, construction and operation may be better understood by reference to the written description taken in conjunction with the drawings, in which:

FIG. 2 is a pictorial representation of one of the processes by which the data plane according to the invention may be produced;

FIG. 3 is a fragmentary view of a data plane produced by the process of FIG. 2, while

FIG. 4 is a pictorial representation of another process for producing the data plane according to the invention;

FIG. 5 is a fragmentary view of a data plane produced by the process of FIG. 4, while

DESCRIPTION OF THE PREFERRED EMBODIMENTS

Data sheets or strips which form the memory planes of the invention may be produced by the same general process. The number of conductive patterns across the width of the fabric in relation to the total width of the data plane arbitrarily determines the designation strip or sheet.

DATA PLANE ENVIRONMENT

Figure 1:
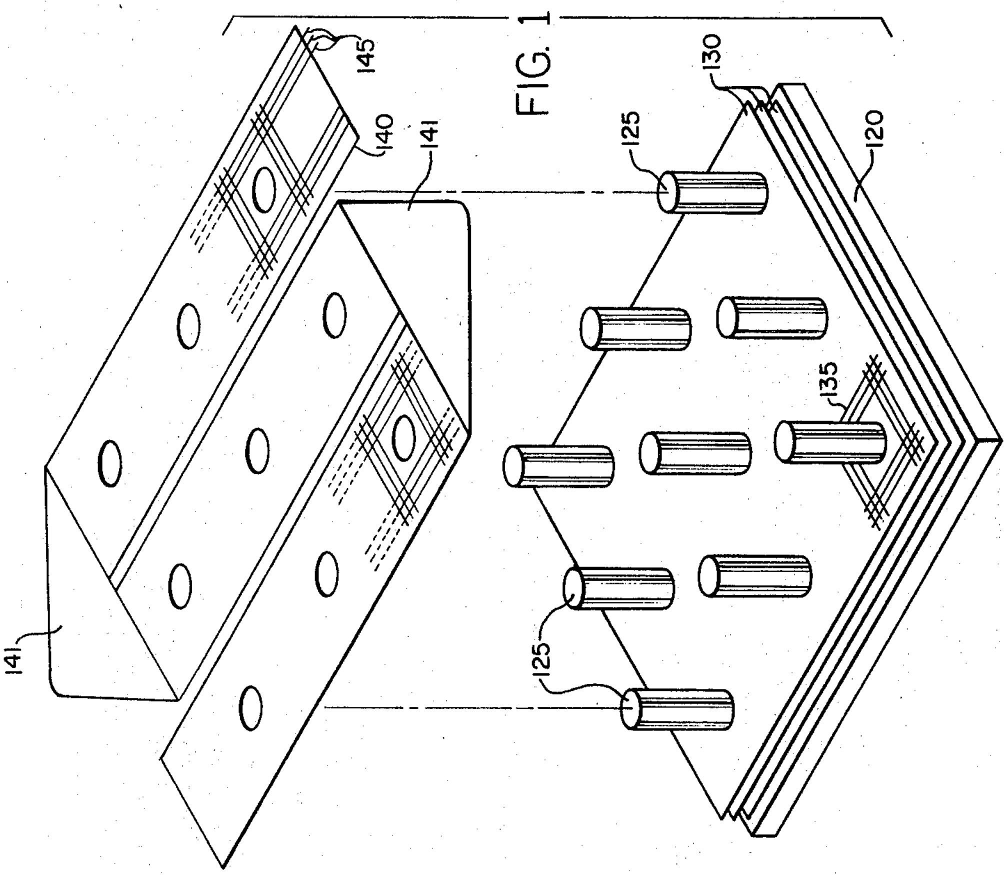
FIG. 1 is a pictorial representation of a solenoid array memory illustrating that data planes may take the form of either sheets or folded strips.

FIG. 1 generally illustrates the use of coded sheets 130 and folded coded strips 140 in a solenoid array memory stack. Briefly, a plurality of elongated solenoids 125 are secured to a mother board 120 and extend through the apertures (i.e., 316, 516 of FIGS. 3 and 5, respectively) of the data planes 130 and 140. Electrical connections may be made to the data planes directly as referenced by leads 135 and 145 or the data planes may be of the type to be indirectly driven by transformer action as described and illustrated in the above-mentioned Pick patent and the Donnelly et al. application.

Although the data planes of the present invention are illustrated in the environment of a solenoid array memory system, the planes may also be employed in systems which employ other signal transfer apparatus, such as the cores in systems of the type described in the above Alonso article.

DATA PLANES AND THEIR MANUFACTURE

Figures 2, 3:
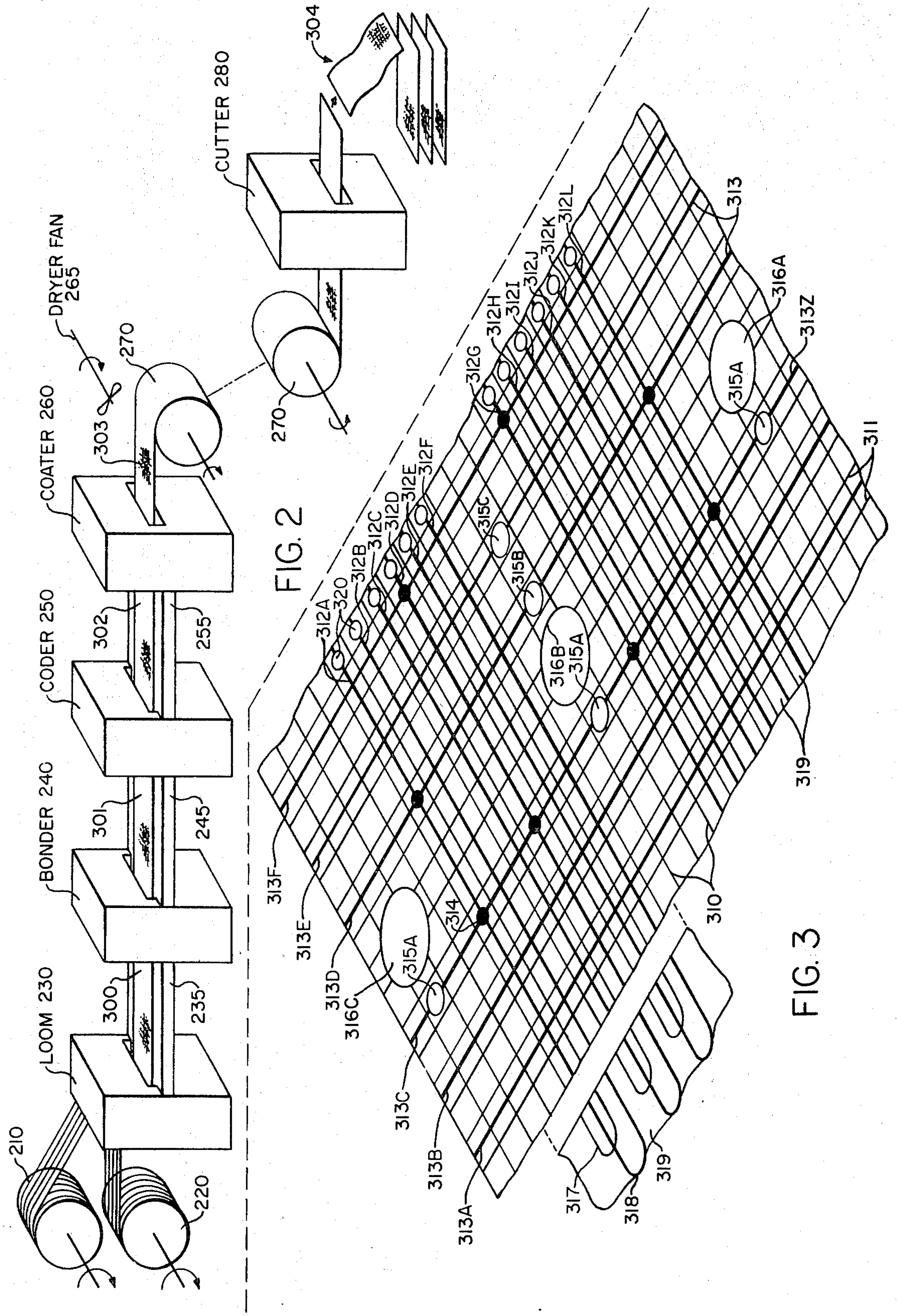

FIG. 2 pictorially illustrates a process, referenced herein as process X1, in which a supply of conductive filaments 210 and a supply of non-conductive filaments 220 are fed to a loom 230 to continuously produce the uncoded fabric 300 which is supported by table 235. Fabric 300 passes through bonding apparatus 240 and emerges as fabric 301 which is supported by table 245. The bonded fabric is passed through a coder 250 which electrically connects selected crosspoints, ruptures selected conductors, and trims the edges of fabric to remove, in particular, the conductive loops 318 of FIG. 3. The coded fabric 302 is supported by table 255 as it is fed into a coater 260 which may be a simple bath of varnish and emerges as fabric 303. The insulative coating may then require drying or curing as symbolized by fan 265. At this point fabric 303 is either collected on a drum 270 and stored for later cutting, or it is sent directly to cutter 280 which provides the desired lengths of encoded fabric 304.

Figure 3A:
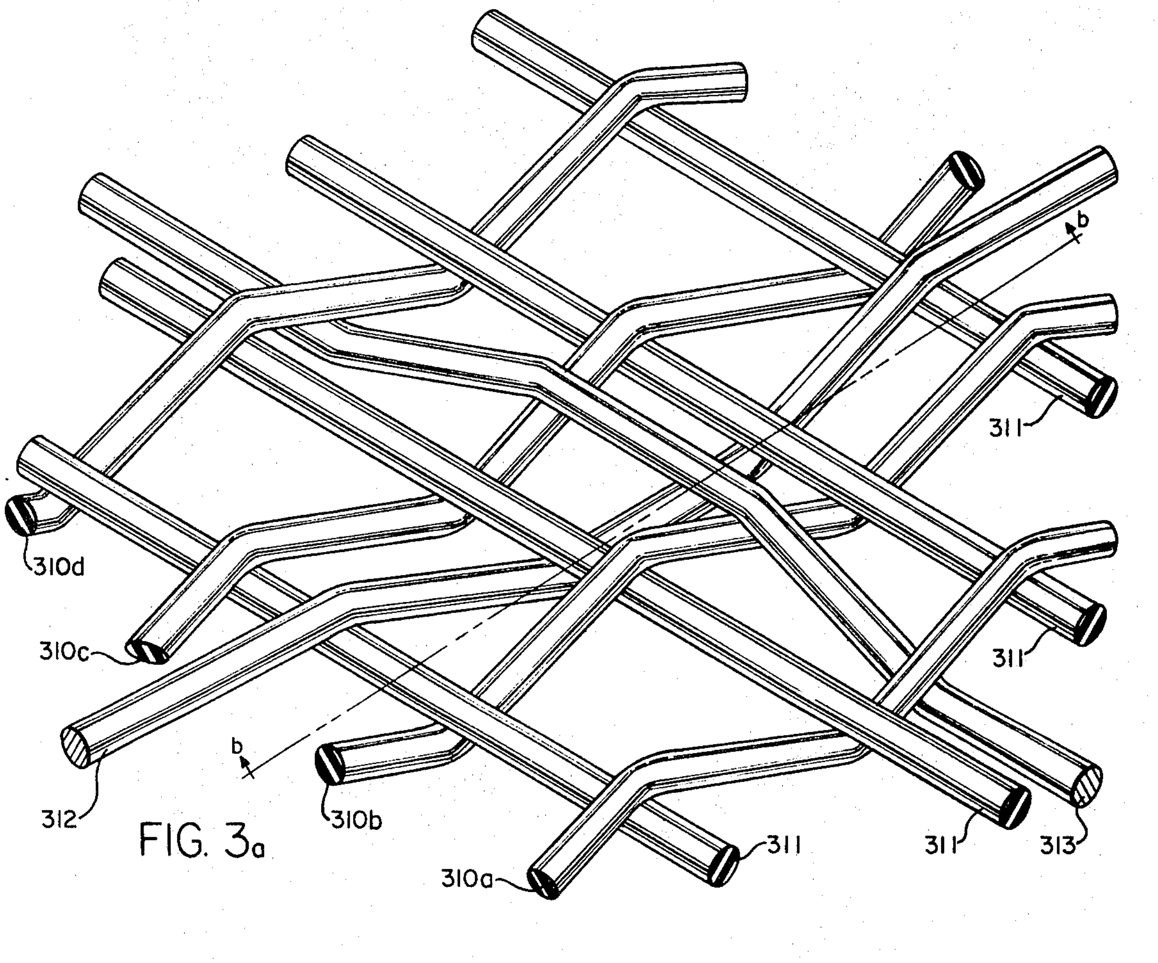
FIG. 3*a* is a pictorial view of the weave of the data plane of FIG. 3.
Figure 3B:
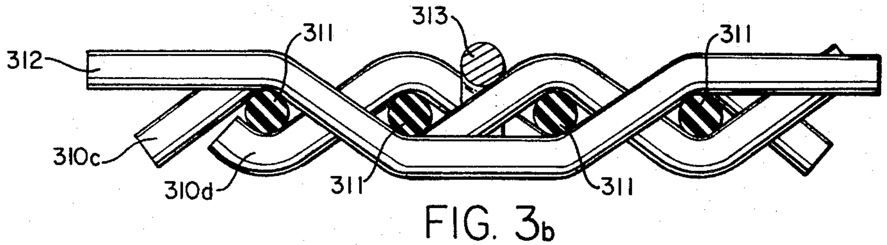
FIG. 3*b* is a section view taken along the line *b—b* of FIG. 3*a* showing the spaced-apart relationship of the conductive members.
Figure 3C:
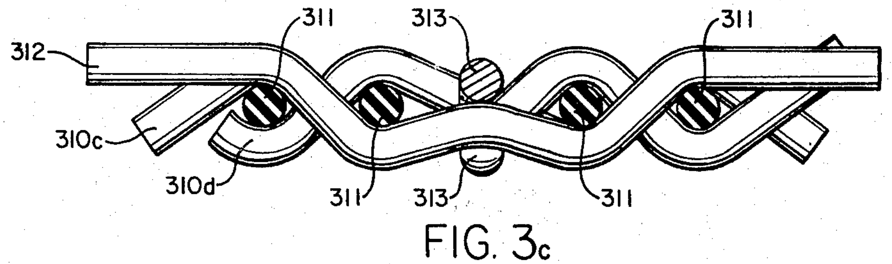
FIG. 3*c* is a similar section view showing the same conductive members in electrical contact.

Insulated intersections, FIGS. 3–3*c*

The data plane illustrated by the fragmentary views of FIG. 3 comprises longitudinal insulator 311 transverse insulators 310, longitudinal conductors 313 and transverse conductors 312 (grouped on each side of an aperture 316). A pattern of groups of three conductors is illustrated in both the longitudinal and transverse directions in the present example. Located in the center of these conductive patterns are the aforementioned apertures 316, for receiving the elongated solenoids or other signal transfer devices of a memory, as illustrated in FIG. 1.

The memory plane is encoded with binary information by directing each longitudinal conductor to either bypass or loop a solenoid accepting aperture 316 with the aid of the transverse conductors. This coding is accomplished as follows. Considering the longitudinal conductors 313 additionally referenced A, B and C, etc., it can be seen that the conductor 313D loops around the solenoid accepting apertures 316A, 313B and 313C by virtue of the electrical connections 314 between conductors 313D, 312A, 313C, 312D, 313F, 312G, 313C again, 312L and 313D again. This composite conductor is further inhibited from by-passing the apertures 316 by virtue of the ruptures of apertures 315A. Furthermore, conductors 313A and 313B have no discontinuities along their lengths and therefore bypass apertures 316. The information is therefore coded as binary 001 in the area of aperture 316B. Conductors 313D and 313E also have discontinuities at apertures 315B and 315C (programmed into the coder) as an aid in coding adjacent bits and to prevent short circuits such as would otherwise be present between conductors 312A and 312L along conductor 313D.

End loops 317 and 318 illustrate the appearance of the edge of the fabric before it is trimmed. The entire data plane is coated with an insulating material 319, such as varnish, to prevent electrical contact between planes. Ruptures, such as illustrated by apertures 320, electrically separate the conductive patterns in the woof direction. Such ruptures are also programmed to be placed in the fabric by the coder.

FIG. 3*a* illustrates the weave of the fabric as comprising transverse insulators 310*a*–310*d*, transverse insulators 311, a transverse conductor 312, and a longitudinal conductor 313. The insulating material is not shown in FIGS. 3*a*, 3*b* and 3*c*. FIG. 3*b* further illustrates this weave showing that, before coding, conductors 312 and 313 are held in a spaced-apart relationship by the insulators 310 and 311. FIG. 3*c* illustrates the appearance of conductors 312 and 313 (minus solder) when they are connected together to form a connection such as 314 of FIG. 3.

Figures 4, 5:
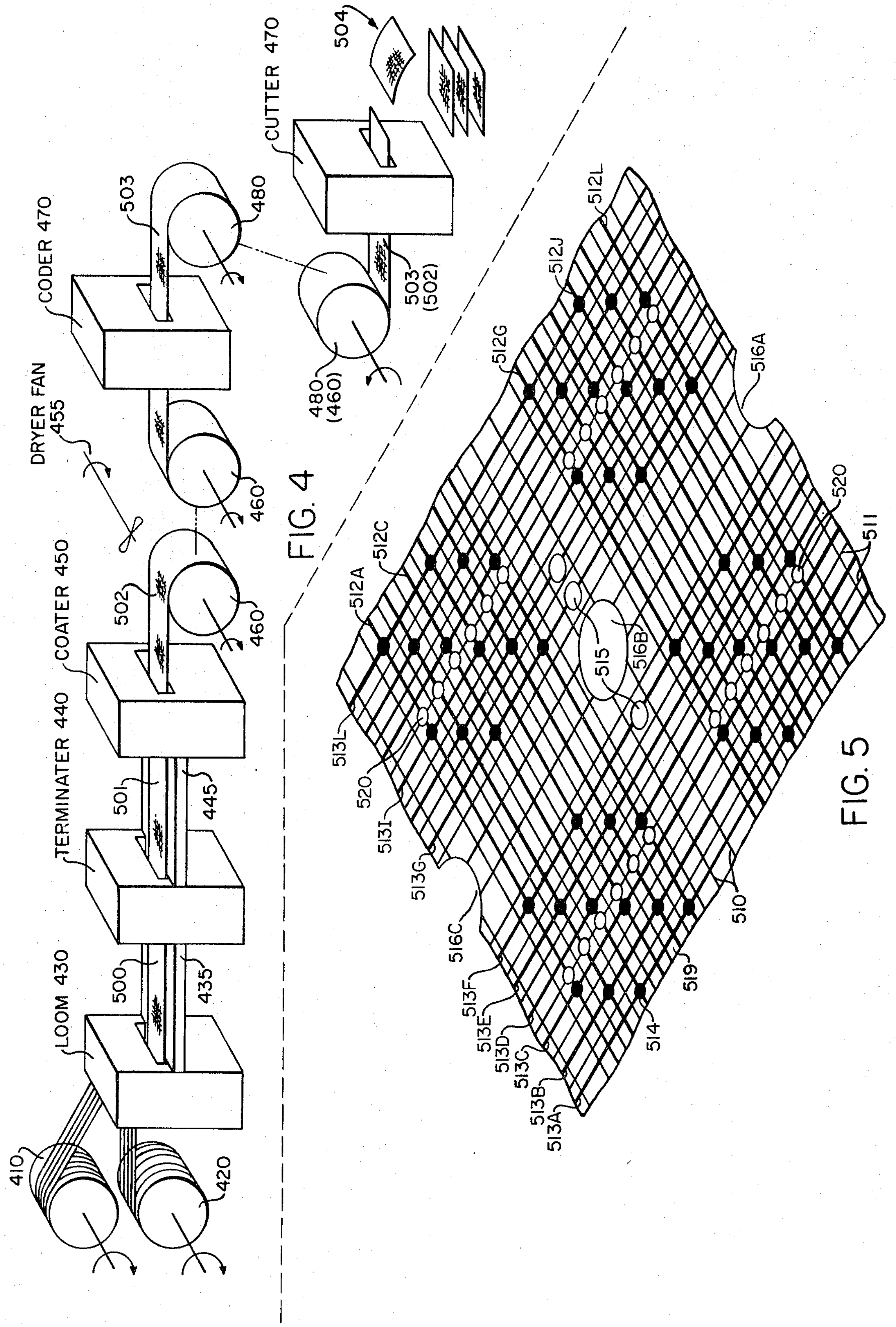

FIG. 4 generally illustrates a process, referenced herein as process Y, wherein spools of insulators 410 and conductors 420 supply loom 430 with material to produce an uncoded fabric 500 which has preselected electrical contacts between warp and woof conductors. Table 435 supports the fabric as it feeds to terminator 440 which electrically connects and secures the preselected crossovers of the conductors to form fabric 501 which is supported by table 445. At this point coater 440 applies insulation to the continuous fabric which is then taken up on drum 460. Drying or curing, symbolized by fan 465, may be required after the insulated coating is applied. Immediately prior to, or just after coating (or drying), the edges of the fabric are trimmed (not shown in FIG. 4, but preferably in the coder 470). In following alternative steps, the fabric may be supplied either directly, or from storage, to a coder 470 which selectively ruptures the longitudinal conductors to provide a continuous coded (and indexed) sheet of material which may be either gathered on drum 480 for storage or passed directly to the cutter 490.

Figure 5A:
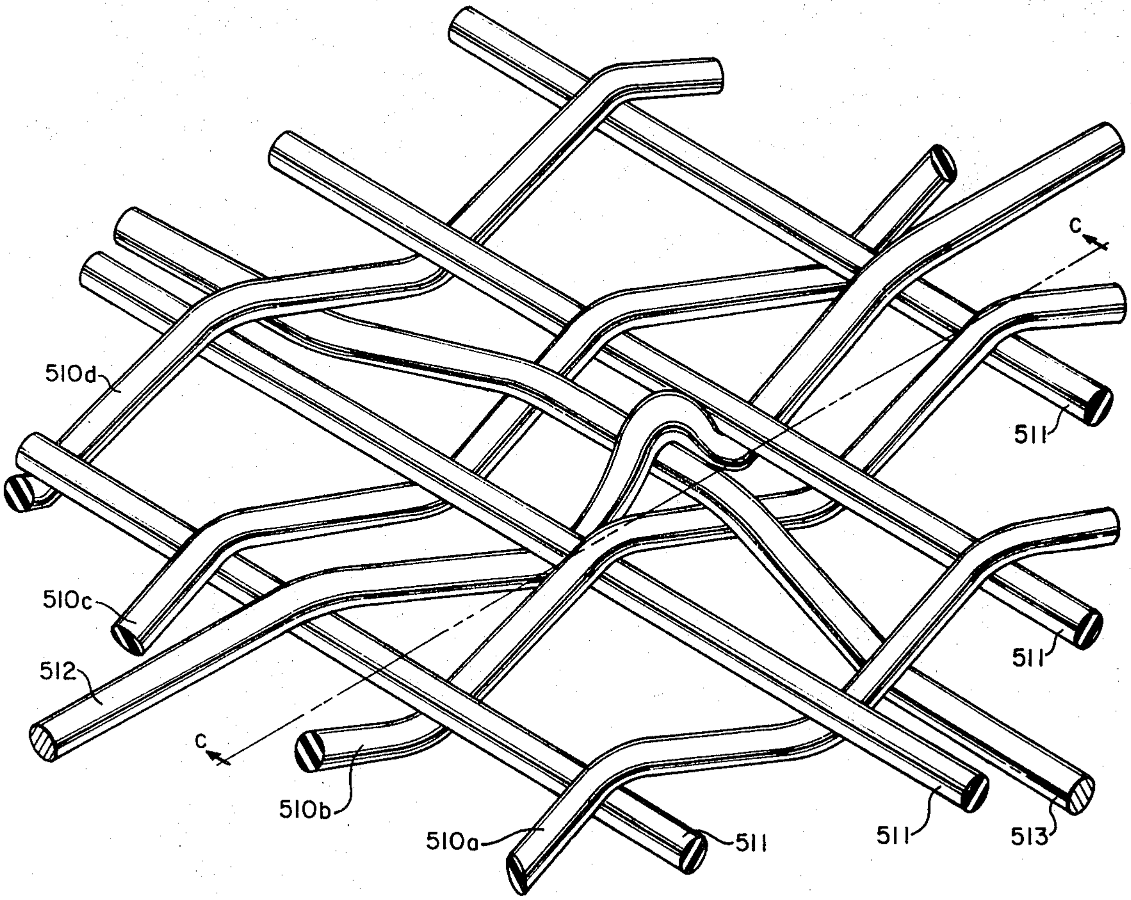
FIG. 5*a* is a detailed pictorial view of the weave of the fabric of FIG. 5 at preselected woven contacting intersections.
Figure 5B:
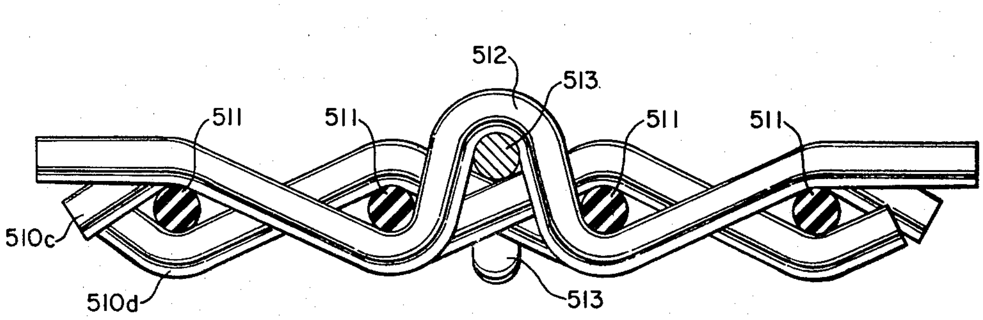
FIG. 5*b* is a sectional view taken along the line *c—c* of FIG. 5*a* showing the contact between the preselected conductors at their intersections.

Connected intersections, FIGS. 5–5*b*

The memory plane illustrated in the fragmentary view of FIG. 5 is, on its face alone, quite similar to that illustrated in FIG. 3; however, the pattern of preselected electrical connections 514 at each intersection of conductors (i.e., 512A, 513A) removes the possibility of—or the need for—electrically connecting these intersections as a portion of the coding operation. It is evident that the coding operation is much simplified for data planes of this particular construction in that the provision of discontinuities, such as those provided by apertures 515, provide for a single type of coding procedure at each solenoid location. Also, by providing groups of conductors on all sides of an aperture 316, a much greater coding availability is provided over the embodiment shown in FIG. 3. The three particular binary digits stored in this illustration by conductors 513D–513F with respect to aperture 516B are 0, 0 and 1, respectively, which can easily be ascertained by following the conductive path for each said conductor with respect to that particular location. The present illustration shows three conductors grouped on each of four sides of an aperture for use with that aperture; however, particular codes may permit one aperture to be encoded by the use of the conductor groups next adjacent thereto (i.e., the conductors of adjacent apertures).

Apertures 520 serve the same purpose as apertures 320 of FIG. 3, namely, separation of conductive patterns in the woof direction.

The fabric itself is similar to that of FIG. 3 in that filaments 510 and 511 are non-conductive elements and elements 512 and 513 are the conductive elements. The weave provides preselected electrical contact at intersections 514 only, the remaining intersections are spaced-apart as shown in FIGS. 3*a* and 3*b*. An insulating material 519 is also applied to the memory plane of FIG. 5 to prevent electrical connections between adjacent planes.

A more detailed look may be had at the preselected contacting intersections of the conductors of this data plane (shown without insulator 519) by referring to FIG. 5*a* wherein insulators 510*a*–510*d* are shown in the transverse direction and insulators 511 are shown in the longitudinal direction. Woven in with the insulators are conductor 513 in the longitudinal direction and conductor 512 in the transverse direction which contacts conductor 513. A section view of this weave is shown in FIG. 5*b*. Although conductors 512 and 513 are specifically woven to make electrical contact, it is preferred that each preselected intersection also be secured by solder, for example, to insure good electrical contact.

Figure 6:
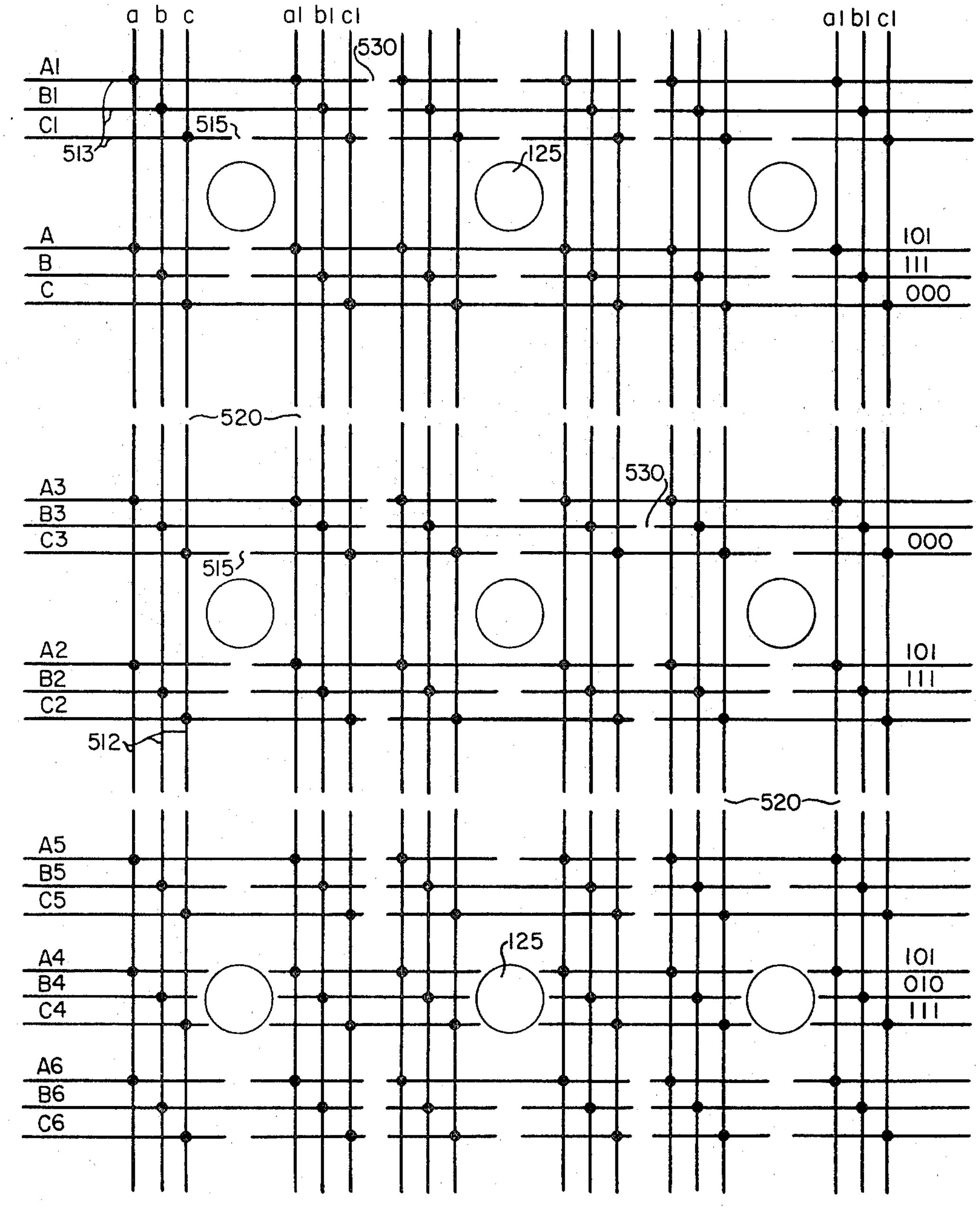
FIG. 6 is a schematic representation of a data plane which is coded by various combinations of conductors and ruptures thereof.

Attention is invited to FIG. 6 which is a schematic representation of various coding techniques which may be employed for weaves similar to those of FIGS. 5, 5*a* and 5*b*. Although in practice the various codings and variations in weave would probably not be employed in the same data plane, FIG. 6 makes a showing of such combinations in order to show the general layout of the conductors (insulators not being shown in FIG. 6). The necessity for ruptures 520 to isolate circuits is more easily seen in FIG. 6 than in the previous drawings.

Furthermore, it will be seen from FIG. 6 how according to one aspect of the present invention which makes use of grids formed from sections of vertical and horizontal conductors provided in groups, a plurality of windings for a given set of signal transfer devices or memory elements can be accommodated in a single data plane—in contrast to, say, the arrangement shown in the above Pat. No. 3,299,412 which requires a separate data plane for each of these windings.

In the first coding technique shown in the top portion of FIG. 6 conductors A, B, C–A1, B1, C1 (warp conductors 513) encircle or bypass the signal transfer devices 125 to store a 1 or 0, respectively. For example, conductor A encircles the left-hand signal transfer device, bypasses the center device and encircles the right-hand device to store 101. More particularly, conductors A, A1 are electrically connected by associated woof conductors *a*, *a*1 and ruptures 515, 530 form the encircle and bypass pattern. Ruptures 515 encode data at each bit location, while ruptures 530 insure encirclement for good coupling in the event that two 1's are consecutively stored (e.g. conductors B, B1).

The second variation shown in the center portion of FIG. 6 employs bipolar encoding. Conductor A2, for example, by way of conductors *a*, A3, A1, etc. partially encircles the right and left signal transfer devices on one side (the upper side) thereof and partially encircles the center device in the opposite direction to carry 101 as the stored data. Similarly conductor C3, by way of conductors, *c* C2, *c*1, etc. partially encircle all three signal transfer devices on the lower side thereof to store 000 as indicated in FIG. 6. The modification shown in the bottom portion of FIG. 6 and providing conductors A4–C6 improves on this type of encoding by utilizing a center set of conductors A4, B4, C4 as central connection busses for the conductors A5, B5, C5 and A6, B6, C6 which are employed to partially encircle their respective sides of the transfer devices. This variation provides more uniform bipolar coupling between the coded circuits and the transfer devices than does the above-mentioned second coding variation. Tracing conductor B4 shows that it and its associated conductors B5, B6, *b*, *b*1 store 010 by partially encircling the left and right devices on the lower sides thereof and the center device on the upper side thereof.

THE PROCESSES

Figure 7:
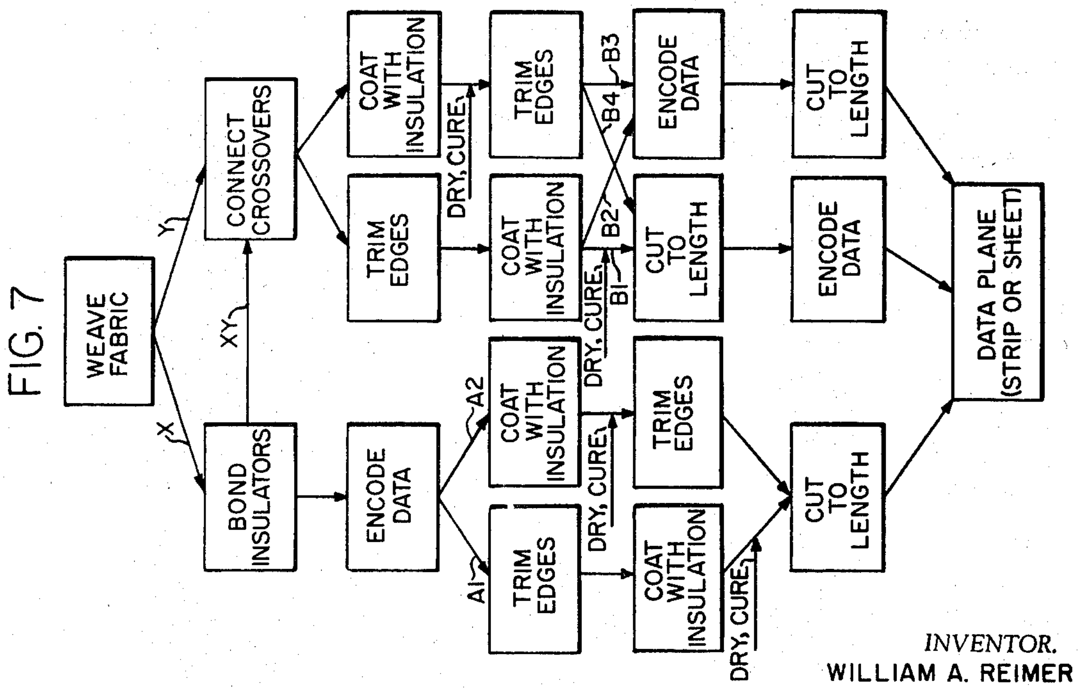
FIG. 7 is a flow chart which describes the step-by-step production of the data planes in accordance with the various processes described herein.

FIG. 7 is a flow chart which illustrates various processes for producing data planes. Each of these processes are set forth below generally as processes X and Y in that the data plane of FIG. 3 may be made by process X and the data plane of FIG. 5 may be made by the process Y. In FIG. 7 designations X and Y have accordingly been shown near the points where these two processes branch off from each other. These processes have been further detailed below as sub-processes X1, X2, Y1, Y2, Y3, Y4 and XY to show the various combinations of steps and orders of performance. Again, the corresponding designations have been applied in FIG. 7 near where these sub-processes begin to follow separate paths.

Sub-process X1

The first step in any of the processes described below is the weaving of the fabric. In this instance a loom would produce the weave shown in FIG. 3*a*. After the fabric is woven, the insulators are bonded at their intersections by thermal or chemical action. Next, the fabric is selectively encoded by electrically connecting selected crosspoints of the conductors by soldering, welding or applying conductive epoxies, and selected conductor sections are removed by punching, electrically arcing, chemically etching, or by controlled sand blasting. The outer edges are then trimmed to form individual transverse conductors from the continuous folded conductor produced by the shuttle during weaving. Finally, the fabric is coated with an insulation, such as varnish or other suitable material (drying or curing may then be required according to the insulation employed) and cut to the desired length.

Sub-process X2

This process is almost identical with the foregoing sub-process with the exception that the fabric 301 of FIG. 2, after being encoded, is first coated with insulation before the edges are trimmed.

Sub-process Y1.

After the fabric is woven into a configuration illustrated in FIG. 5, the preselected crosspoints of the electrical conductors 512 and 513 are connected to insure good electrical conductivity. Then the edges of the fabric are trimmed to remove the end loops of the transverse conductors. Next, the fabric is coated with insulation and, finally, cut to the desired length for storage as uncoded data planes. This process is preferred for providing a supply of uncoded data planes which are to have their information content provided at a later time. This is particularly useful for changes in information where an uncoded data plane is coded with information in the field to replace a data plane which needs an up-dating of information.

Sub-process Y2

After the fabric is woven and the electrical conductors are connected at preselected crossovers as in process Y1, the fabric is next coated with insulation and the edges are then trimmed. The continuous sheet is then encoded with data by any of the aforementioned or other means of rupturing and finally cut to the desired length. Process Y2 would be advantageously employed in initial fabrication of a memory stack in that each plane could also be indexed and identified (by punching, stamping indicia, etc.) at the time of coding the continuous sheet which would minimize the handling of the data planes.

Sub-process Y3

Process Y3 is a combination of portions of sub-processes Y1 and Y2 in that after the cloth is woven and the electrical conductors are connected at the preselected intersections, the edges are first trimmed, then the continuous sheet is coated with insulation, the data is encoded in the continuous sheet and, finally the data planes are cut to the desired length.

Sub-process Y4

This process comprises the following steps: weaving the fabric; electrically and mechanically connecting the preselected intersections of the conductors; coating the continuous fabric with insulation; trimming the edges of the continuous fabric; cutting the fabric to the desired length; and encoding data in the separate data planes so formed.

In following sub-process Y1 or Y4, fabric 502 would be fed either directly or indirectly to cutter 490 to provide uncoded data sheets which would then be passed through an encoder to provide coded data planes.

Sub-process XY

It should be noted that data planes may be fabricated with a weave such as shown in FIG. 5 by employing a portion of process X, wherein just prior to or after the step of bonding, and the preselected intersections of the conductors are connected, as performed by the terminator 440 of FIG. 4. Then the step of encoding data includes only selective rupturing of the conductors. Of course, the fabric would also be trimmed and coated as set forth above.

Although the above description sets forth the trimming step as being performed either just before or just after the fabric is coated with insulation, the woof conductors may be separated at any time after the fabric has been woven. It is preferred, though, that first the insulators be bonded in process X or the conductors be connected in process Y to prevent any shift in conductor positions.

The subject matter of the present invention relating to its method aspects has been covered in a divisional application.

What I claim is:

1. For use in memory systems having an array of signal transfer apparatus, a woven data plane comprising parallel first insulators, first conductors parallel to said first insulators and divided into spaced-apart groups with the individual conductors thereof being interspersed between said first insulators, parallel second insulators at right angles to said first insulators and first conductors and interwoven therewith, second conductors parallel to said second insulators and divided into spaced-apart groups with the individual conductors thereof being interspersed between said second insulators and interwoven with said first insulators and said first conductors, an array of apertures in said plane for receiving said array of signal transfer apparatus, and electrical connections between at least some of said first and second conductors at their respective intersections and ruptures in selected conductors which form code-bearing circuits which selectively encircle and bypass said apertures to store data.

2. The data plane set forth in claim 1, wherein said first and second conductors are uninsulated wires, and further comprising a layer of electrically insulating material covering both sides of said plane.

3. The data plane according to claim 1, wherein said conductors are interwoven with said insulators in a pattern in which said electrical connections are provided by said first and second conductors making conductive contact with each other at preselected intersections thereof, and wherein said conductors are selectively ruptured to form said code-bearing circuits.

4. The data plane according to claim 1, wherein each conductor of said groups of first and second conductors is associated with a corresponding conductor of every other group, and wherein said electrical connections are located at all the intersections of such associated conductors to provide conductive grids, and wherein said ruptures selectively interrupt said grids to provide said code-bearing circuits from a series of said grids.

5. The data plane set forth in claim 1, wherein said first and second insulators are bonded together at their intersections.

6. For use in a memory system having an array of signal transfer apparatus, a data plane comprising separate first-coordinate and second-coordinate insulating means having an array of apertures therein for receiving said signal transfer apparatus, parallel spaced-apart first-coordinate conductors, parallel spaced-apart second-coordinate conductors perpendicular to said first-coordinate conductors, electrical connections at selected intersections of said first-coordinate and second-coordinate conductors, said first-coordinate and second-coordinate insulating means being located to hold said first-coordinate and second-coordinate conductors in spaced-apart relation normal to said plane at all other intersections thereof, and ruptures in selected ones of said conductors to form a plurality of separate code-bearing circuits therefrom, each of said circuits extending adjacent and selectively around said apertures.

7. In a magnetic memory having a matrix of magnetic elements and a plurality of windings each linking said elements in a coded pattern, the improvement that there is provided an array of vertical and horizontal groups of conductors extending substantially in a single plane, each said vertical group and each said horizontal group comprising a plurality of conductors corresponding in number to that of said windings, each of said magnetic elements being located in the space between two neighboring vertical ones and two neighboring horizontal ones of said groups of conductors, said vertical conductors and said horizontal conductors being insulated from each other except at crossings thereof selected so as to form a plurality of separate rectangular loop configurations about each of at least certain ones of said elements, and the individual conductors having interruptions therein at selected points of said loop configurations, so that there exists at each element location a corresponding group of conducting paths in said plane each forming a section of the corresponding one of said plurality of windings, said conducting paths selectively linking the respective element in accordance with said coded pattern.

References Cited

UNITED STATES PATENTS

| | | | |
|---|---|---|---|
| 3,234,529 | 2/1966 | Hsueh et al. | 340—174 |
| 3,432,830 | 3/1969 | Owen et al. | 340—174 |

STANLEY M. URYNOWICZ, Jr., Primary Examiner